United States Patent
Song

(10) Patent No.: US 8,749,614 B2
(45) Date of Patent: Jun. 10, 2014

(54) METHOD FOR INDICATING A 3D CONTENTS AND APPARATUS FOR PROCESSING A SIGNAL

(75) Inventor: Tae Sun Song, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 251 days.

(21) Appl. No.: 12/792,386

(22) Filed: Jun. 2, 2010

(65) Prior Publication Data

US 2011/0090304 A1    Apr. 21, 2011

Related U.S. Application Data

(60) Provisional application No. 61/252,166, filed on Oct. 16, 2009.

(51) Int. Cl.
*H04N 13/00* (2006.01)

(52) U.S. Cl.
USPC .......................................................... 348/42

(58) Field of Classification Search
USPC .......................................................... 348/100
See application file for complete search history.

(56) References Cited

U.S. PATENT DOCUMENTS

| | | | |
|---|---|---|---|
| 5,880,729 A | 3/1999 | Johnston, Jr. et al. | |
| 6,157,383 A | 12/2000 | Loop | |
| 6,621,509 B1 | 9/2003 | Eiref et al. | |
| 7,441,201 B1 | 10/2008 | Printezis | 715/762 |
| 7,685,619 B1 * | 3/2010 | Herz | 725/52 |
| 2002/0171686 A1 * | 11/2002 | Kamen et al. | 345/850 |
| 2004/0070673 A1 * | 4/2004 | Nakamura | 348/207.2 |
| 2004/0100479 A1 | 5/2004 | Nakano et al. | |
| 2004/0107439 A1 * | 6/2004 | Hassell et al. | 725/44 |
| 2006/0139448 A1 * | 6/2006 | Ha et al. | 348/51 |
| 2006/0192776 A1 | 8/2006 | Nomura et al. | |
| 2006/0253802 A1 | 11/2006 | Kim | |
| 2007/0003134 A1 | 1/2007 | Song et al. | |
| 2007/0121182 A1 * | 5/2007 | Fukushima et al. | 359/9 |
| 2007/0165027 A1 | 7/2007 | Nakadaira et al. | |
| 2007/0274672 A1 * | 11/2007 | Itoi | 386/46 |
| 2007/0300184 A1 | 12/2007 | Song | 715/810 |
| 2008/0309755 A1 * | 12/2008 | Yoshida et al. | 348/51 |
| 2009/0002368 A1 | 1/2009 | Vitikainen et al. | 345/422 |
| 2009/0116818 A1 | 5/2009 | Sasaki et al. | |

(Continued)

FOREIGN PATENT DOCUMENTS

| CN | 1497923 A | 5/2004 |
|---|---|---|
| CN | 1882106 A | 12/2006 |

(Continued)

OTHER PUBLICATIONS

European Search Report for Application PCT/KR2010/003451 dated Dec. 28, 2010.

(Continued)

*Primary Examiner* — Joseph Ustaris
*Assistant Examiner* — Ellyar Y Barazesh
(74) *Attorney, Agent, or Firm* — KED & Associates LLP

(57) ABSTRACT

A method and apparatus may be provided that includes receiving a signal that includes content at an image display device, determining whether the content within the received signal includes three dimensional (3D) image data, displaying information about the content within the received signal on a display of the image display device, and displaying a 3D indicator on the display when the content within the received signal is determined to include 3D image data.

12 Claims, 15 Drawing Sheets

(56) References Cited

U.S. PATENT DOCUMENTS

| | | | |
|---|---|---|---|
| 2009/0141172 | A1 | 6/2009 | Liu |
| 2009/0141180 | A1 | 6/2009 | Kondo et al. |
| 2009/0153737 | A1 | 6/2009 | Glen ..................... 348/571 |
| 2009/0263007 | A1 | 10/2009 | Kitaura et al. |
| 2010/0026790 | A1 | 2/2010 | Ohba et al. |
| 2010/0039428 | A1* | 2/2010 | Kim et al. ............... 345/419 |
| 2010/0074584 | A1 | 3/2010 | Jin et al. |
| 2010/0074594 | A1 | 3/2010 | Nakamura et al. |
| 2010/0118120 | A1* | 5/2010 | Takahashi et al. ........... 348/43 |
| 2010/0225645 | A1* | 9/2010 | Suh et al. ................. 345/419 |
| 2012/0162367 | A1* | 6/2012 | Ha ............................. 348/43 |
| 2012/0182402 | A1* | 7/2012 | Hwangbo et al. ............ 348/51 |

FOREIGN PATENT DOCUMENTS

| | | |
|---|---|---|
| EP | 1024672 A1 | 8/2000 |
| EP | 1 187 495 | 3/2002 |
| EP | 1406456 A2 | 4/2004 |
| EP | 1909510 A1 | 4/2008 |
| JP | H07274216 A | 10/1995 |
| JP | H08331599 A | 12/1996 |
| JP | 2002-095014 | 3/2002 |
| JP | 2005-065162 | 3/2005 |
| JP | 2005-110121 | 4/2005 |
| KR | 10-2007-0052260 | 5/2007 |
| KR | 10-2008-0028366 | 3/2008 |
| KR | 10-2009-0004181 | 1/2009 |
| WO | WO 01/31585 | 5/2001 |
| WO | WO 2008/001264 | 1/2008 |
| WO | WO 2008/013131 | 1/2008 |
| WO | WO 2009/077927 A1 | 6/2009 |

OTHER PUBLICATIONS

European Search Report for Application PCT/KR2010/003452 dated Dec. 29, 2010.
European Search Report for Application PCT/KR2010/003009 dated Dec. 29, 2010.
D.D.R.J. Bolio, "Integration of 3D Video into the Blu-ray format," Master Thesis, Dept. of Mathematics and Computer Science, Technische universiteitEindhoven, Eindhove, Oct. 2007.
Office Action dated Jul. 23, 2012 for U.S. Appl. No. 12/788,393.
U.S. Office Action for U.S. Appl. No. 12/791,319 dated Apr. 8, 2013.
U.S. Office Action for U.S. Appl. No. 12/788,393 dated May 8, 2013.
Final Office Action dated Dec. 31, 2012 for U.S. Appl. No. 12/788,393.
HDMI: "High-Definition Multimedia Interface. Specification Version 1.4", Internet Citation, Jun. 5, 2009, 425 pages, XP009133650, Retrieved from the Internet: URL: http://wenku.baidu.com/view/e7db77d184254b35eefd34d0.html.
D.D.R.J. Bolio "Integration of 3D video into the Blu-ray format", Master Thesis Technische Universiteit Eindhoven Department of Mathematics and Computer Science, Technische Universiteit Eindhoven, NL, Oct. 31, 2007, 118 pages (pages I-IX, 1, XP008148221), Retrieved from the Internet: URL:http://alexandria.tue.nl/extra1/afstvers1/wsk-i/bolio2007.pdf.
European Search Report dated Jul. 11, 2013 for co-pending Application No. 10792258.5.
European Search Report dated Aug. 27, 2013 for corresponding Application No. 10823521.9.
U.S. Office Action dated Sep. 12, 2013 for co-pending U.S. Appl. No. 12/791,319.
U.S. Office Action for U.S. Appl. No. 12/791,319 dated Jan. 27, 2014.
U.S. Office Action for U.S. Appl. No. 12/788,393 dated Dec. 30, 2013.
Chinese Office Action dated Mar. 5, 2014 issued in Application No. 201080046352.0 (with English translation).
Extended European Search Report for Application 10797238.2 dated Dec. 20, 2013.
Korean Notice of Allowance for Application 10-2012-7005784 dated Dec. 20, 2013.
"3D Active Button Magic" XP007922454 MultiMedia Soft Jan. 1, 2002 pp. 1-12.

* cited by examiner a) L/R format b) T/B format c) Checker BD format d) Frame Sequential format (a)          (b)          (c)

METHOD FOR INDICATING A 3D CONTENTS AND APPARATUS FOR PROCESSING A SIGNAL

This application claims priority and benefit of U.S. Provisional Application No. 61/252,166, filed Oct. 16, 2009, the subject matter of which is hereby incorporated by reference.

BACKGROUND

1. Field

Embodiments of the present invention may relate to a method for indicating a three-dimensional (3D) content and an apparatus for processing a signal. More particularly, embodiments of the present invention may relate to a method and apparatus for determining a 3D content from among contents included in a signal and indicating the 3D content distinguishable from other content.

2. Background

Along with growth of digital broadcasting, digital contents have increased in amount and diversified, as compared to analog broadcasting.

While most digital content may be two-dimensional (2D) content, a 3D content may allow a viewer to enjoy a 3D effect and a sense of reality. 3D content may be enjoyed through a receiver at home, for example.

When a 2D content coexists with a 3D content in received contents, a receiver may not identify and indicate the 3D content when providing information about the content to a viewer. Therefore, if the viewer selects 3D content based on the content information provided by the receiver without knowing that they are 3D content, the viewer may view broken and/or flickering images.

BRIEF DESCRIPTION OF THE DRAWINGS

Arrangements and embodiments may be described in detail with reference to the following drawings in which like reference numerals refer to like elements and wherein.

DETAILED DESCRIPTION

Reference may now be made in detail to arrangements and embodiments, examples of which may be illustrated in the accompanying drawings. Wherever possible, the same reference numbers may be used throughout the drawings to refer to the same or like parts. In addition, although terms may be selected from generally known and used terms, some of the terms may have been selected by the applicant at his or her discretion, the detailed meanings of which may be described in relevant parts of the description herein. Further, embodiments may be understood, not simply by actual terms used, but also by the meaning of each term lying within.

A method for indicating three-dimensional (3D) content and an apparatus for processing an image signal may be described below in detail.

Figure 1:
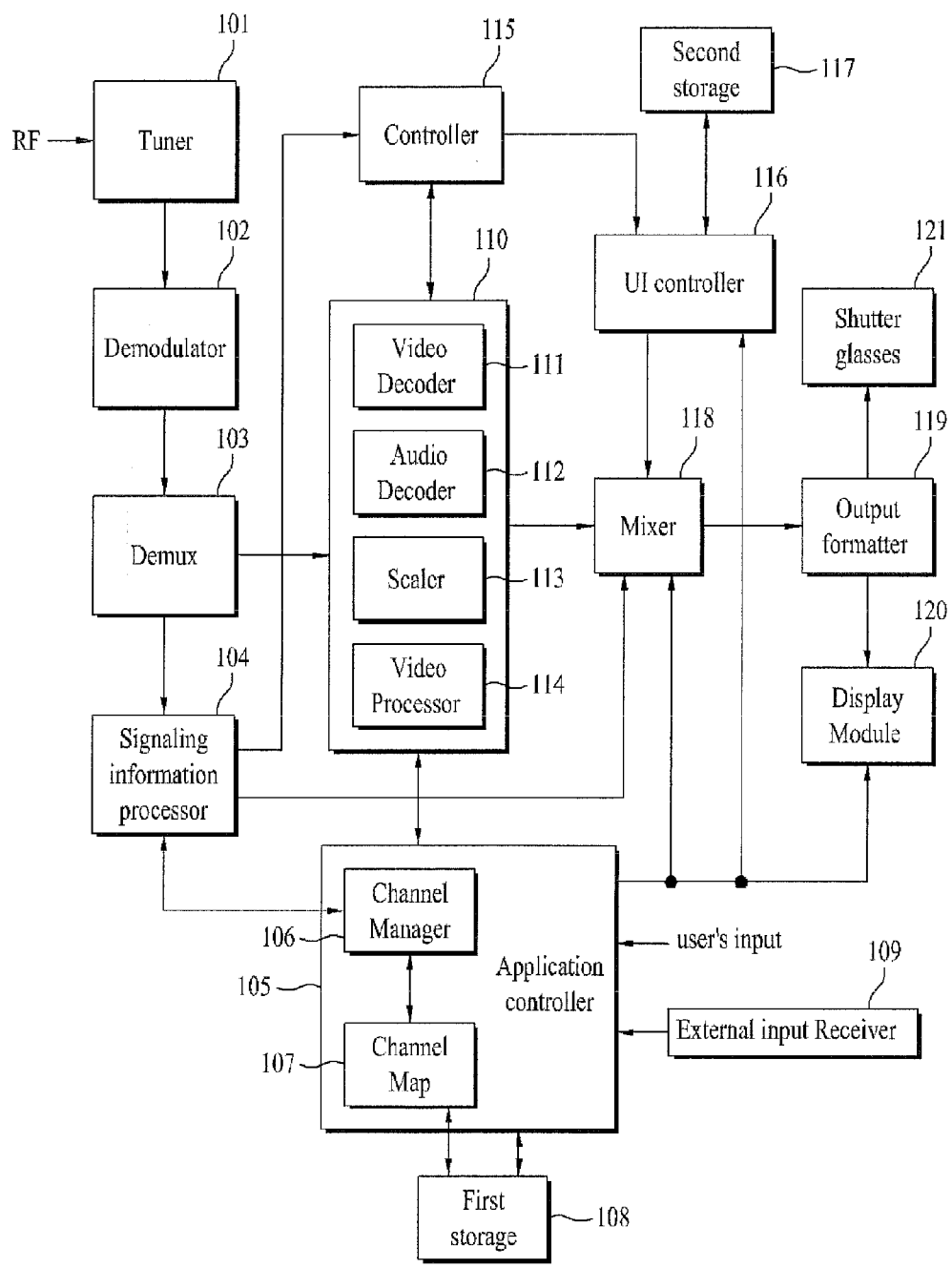
FIG. 1 is a block diagram of an apparatus for processing a signal according to an exemplary embodiment.

FIG. 1 is a block diagram of an apparatus for processing a signal according to an exemplary embodiment. Other arrangements and embodiments may also be provided.

FIG. 1 shows a signal processing apparatus that includes a tuner 101, a demodulator 102, a demultiplexer 103, a signaling information processor 104, an application controller 105, a channel manager 106, a channel map 107, a first storage unit 108, an external input receiver 109, a decoder/scaler 110, a controller 115, a User Interface (UI) controller 116, a second storage unit 117, a mixer 118, an output formatter 119 and a display module 120 (or display). For example, the signal processing apparatus may be a Digital TeleVision (DTV) receiver. The signal processing apparatus may include components for processing the signal other than the components shown in FIG. 1.

A 3D content may be received in a broadcast signal, or may be inputted through an external input. For example, the external input may include a Universal Serial Bus (USB) input, a component input, a High Definition Multimedia Interface (HDMI) input, a Syndicat des Constructeurs d'Appareils Radiorécepteurs et Téléviseurs (SCARY) input, an Audio/Video (A/V), etc. The 3D content may be converted by a Digital Video Express (DivX) format and the like.

The signal processing apparatus may be described separately in case of external input of 3D content and in case of input of 3D content in a broadcast signal.

A description may first be made of the signal processing apparatus that receives 3D content through an external input.

The external input receiver 109 may be coupled to an external input device in one of various manner and receive a content from the external input device.

The decoder/scaler 110 may determine an attribute of the content received via the application controller 105 from the external input receiver 109 and notify the controller 115 of the determined content attribute. The content attribute may indicate whether the content includes 2D image data or includes 3D image data.

A video processor 114 in the decoder/scaler 110 may determine presence or absence of attribute information about the content received from the application controller 105. In the presence of the attribute information, the video processor 114 may extract the attribute information, decode the attributable information, and provide the decoding result to the controller 115. The extracted attribute information may identify whether content includes 2D image data or whether content includes 3D image data.

In the absence of the attribute information, the video processor 114 may autonomously determine the attribute of the received content. A manner of how the video processor 114 determines the attribute may be described below.

A description may now be made of operating the signal processing apparatus when a broadcast signal including a content is received through a Radio Frequency (RF) channel.

The tuner 101 may tune a channel to receive the broadcast signal.

The demodulator 102 may demodulate the broadcast signal received from the tuner 101.

The demultiplexer 103 may demultiplex the demodulated broadcast signal to an audio signal, a video (or an image) signal and signaling information. The demultiplexer 103 may demultiplex the demodulated signal by a Packet Identifier (PID) filtering. For ease of description, the signaling information may be described in the context of System Information (SI) such as Program Specific Information/Program and System Information Protocol (PSI/PSIP) information, for example. The demultiplexer 103 may output the demultiplexed A/V signal to the decoder/scaler 110 and the demultiplexed signaling information to the signaling information processor 104.

The signaling information processor 104 may decode the demultiplexed signaling information and output the decoded signaling information to the application controller 105, the controller 115 and the mixer 118. The signaling information processor 104 may include an internal database (not shown) for temporarily storing the decoded signaling information. The signaling information may include attribute information about the content. Accordingly, the signaling information processor 104 may determine whether attribute information identifies that the content includes 2D image data or includes 3D image data based on the decoded signaling information. In the presence of the attribute information, the signaling information processor 104 may extract the attribute information from the decoded signaling information, and determine an attribute of the content. The signaling information processor 104 may output the determination results to the controller 115. In the absence of the attribute information, the signaling information processor 104 may notify the controller 115 that the attribute information is not included in the decoded signaling information so that the attribute of the content may be determined by a predetermined method.

The application controller 105 may include a channel manager 106 and a channel map 107. The channel manager 106 may configure and manage the channel map 107 based on the decoded signaling information. The application controller 105 may receive a user's input and output a control signal based on the received user's input to the UI controller 116, the mixer 118 and the module 120. The first storage unit 108 may store information as a system.

The decoder/scaler 110 may include a video decoder 111, an audio decoder 112, a scaler 113, and a video processor 114.

The video decoder 111 and the audio decoder 112 may decode the demultiplexed video and audio signals received from the demultiplexer 103.

The scaler 113 may scale the decoded video and audio signals to appropriate sizes.

The video processor 114 may determine the attribute of content according to a content attribute determining method (described below) in response to a control signal received from the controller 115. The video processor 114 may determine the attribute of content when the signaling information does not include attribute information about contents.

Components for determining the 2D or 3D attributes of contents in the signal processing apparatus have been described above. A description may now be made of components for processing contents whose attributes have been determined.

The controller 115 may receive information about attributes of the contents from the video processor 114 and the signaling information processor 104, and control the contents to be appropriately processed based on their attributes. The information about attributes of the contents may be based on attribute information included in the signaling information or may be determined by the video processor 114 in a method described below.

The controller 115 may identify a 3D content based on the attribute information and control the 3D content so as to be distinguishable from 2D content on a UI configured on a display.

The UI controller 116 may control pre-stored 3D content identification information to be read and control the identified 3D content to be distinguishable from other contents on the UI using the 3D content identification information. The 3D content identification information may be an indicator or On Screen Display (OSD) data and may be displayed over information about the content displayed in the UI. For example, the UI controller 116 may generate and output the 3D content identification information in such a manner that the 3D content identification information is displayed over a preview image or a thumbnail image in the UI, an Electronic Program Guide (EPG), a channel browser, information about the content in a content list and a banner indicating information about the content.

The mixer 118 may mix the outputs of the signaling processor 104, the decoder/scaler 110, and the UI controller 116.

The output formatter 119 may configure the output of the mixer 118 to 3D content data based on an output format of the module 120. The output formatter 119 may act as a 3D formatter for, in case of 2D content, outputting the 2D content without any processing (or a bypassing), and in case of 3D content, processing the 3D content based on the output format and an output frequency of the module 120.

The module 120 may output the signal received from the output formatter 119 based on the output frequency.

A method for allowing a user to view the 3D image may be either a first method for providing the user with glasses or a second method where the user does not wear glasses.

The first method for providing the user with polarization glasses may be classified as either a passive scheme or an active scheme. The passive scheme may display a left view image and a right view image using a polarization filter in different ways. The passive scheme may provide user's eyes with each blue glasses and red glasses. The passive scheme may provide user's eyes with a pair of blue and red glasses, such that the user can view a 3D or stereoscopic image through the pair of colored glasses. The active scheme may discriminate between a left view image and a right view image using a liquid crystal shutter. The left view image (i.e., a user's left eye) and the right view image (i.e., a user's right eye) may be sequentially covered according to the active scheme such that the left view image and the right view image can be distinguished from each other. The active scheme may repeatedly display screen images created by time division at intervals of a predetermined time period, and allow a user who wears glasses including an electronic shutter synchronized with the predetermined time period to view a 3D image.

The active scheme may also be called a scheme of a time split type or a scheme of a shuttered glass type.

Examples of the second scheme where the user does not wear glasses may include a lenticular scheme and a parallax barrier scheme. In the lenticular scheme, a lenticular lens plate in which a cylindrical lens array is vertically arranged may be installed in front of a video panel. In the parallax barrier scheme, a barrier layer including periodic slits may be installed on the video panel.

For ease of explanation, a stereoscopic scheme (from among 3D display schemes) may be used as an example, and the active scheme (from among stereoscopic schemes) may be used as an example. Although shutter glasses may be used as an exemplary medium of the active scheme, embodiments and arrangements are not limited thereto, and may also be applied to other mediums without departing from the spirit or scope of arrangements/embodiments.

The output formatter 119 may output the constructed 3D image data to the module 120, generate a synchronous signal (V_sync) associated with stereoscopic image data having the changed arrangement in a manner that the output 3D image data is synchronized with the shutter glasses 121, and output the synchronous signal (V_sync) to an Infrared Rays (IR) emitter (not shown) so that the user can view the 3D image data through the shutter glasses 121 according to a display synchronization of the shutter glasses 121.

The IR emitter may receive the synchronous signal generated from the output formatter 119, and output the received synchronous signal to a light receiving unit (not shown) contained in the shutter glasses 121. The shutter glasses 121 may adjust the shutter open period in response to the synchronous signal received via the IR emitter after passing through the light receiving unit such that it may be synchronized with stereoscopic image data generated from the module 120.

3D Image Determination Method

Figure 2:
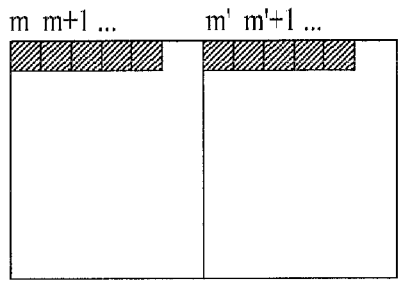
FIG. 2 illustrates a method for determining whether received content includes a 2D image data or a 3D image data.
Figure 2:
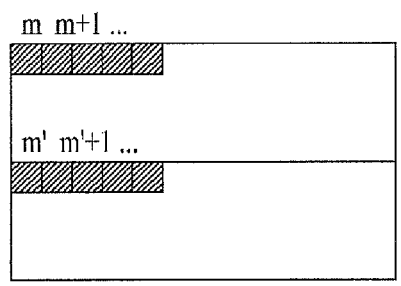
Figure 2:
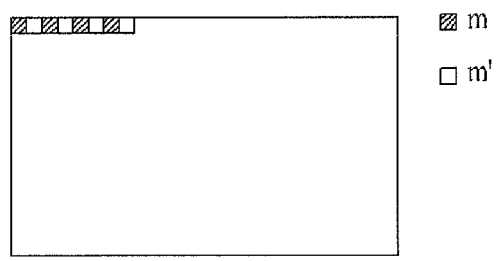
Figure 2:
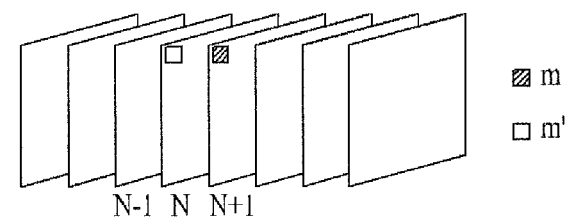

FIG. 2 illustrates a method for determining whether received content includes 2D image data or includes 3D image data.

FIGS. 2(*a*) to 2(*d*) illustrate exemplary 3D formats for describing the content attribute determining method. Other 3D formats may also be applicable as a content attribute determining method.

Content attribute determination may be considered in two ways, namely the presence of attribute information in a received signal and the absence of the attribute information in the received signal.

The presence of attribute information in a received signal may be further branched into an example of external input of the image signal and an example of input of the broadcast signal through an RF channel from a broadcasting station or the like.

In the former case, when a video (image) file such as a DivX file is played using an external input device (e.g. a USB device), a determination may be made whether the video file includes 2D image data or 3D image data by extracting an info frame including attribute information about images and decoding the attribute information.

In the latter case, attribute information may be extracted from signaling information included in a broadcast signal received from a broadcasting station and decoded. Then a determination may be made whether the content of the received broadcast signal includes 2D image data or includes 3D image data.

In the absence of attribute information, for example, when the signaling information of a received signal does not include attribute information, or when attribute may not be determined based on the attribute information, the signal processing apparatus itself may determine the attribute of a content.

With reference to FIG. 2, a method for determining the attribute of a content in the signal processing apparatus in the absence of attribute information may be described below. The video processor 114 shown in FIG. 1 may determine an attribute, for example.

The video processor 114 may determine whether a received content is in any of the 3D formats shown in FIGS. 2(*a*) to 2(*d*). If the content does not match any of the 3D formats, the video processor 114 may determine that the content includes 2D image data. On the other hand, if the content matches one of the 3D formats, the video processor 114 may determine that the content includes 3D image data. The type of the format of a content as well as the attribute of the content may be determined at one time.

The method for determining the attribute of received content (i.e., determining whether received content includes 3D image data) may be described below in more detail.

To make a decision as to the attribute of a content, for example, a Euclidean distance (or Euclidean metric) between two points m and m' in a 3D space may be calculated.

$$\int \Sigma (m-m') = k < \epsilon (\epsilon \text{ is a 3D determination threshold value}) \quad \text{[Equation 1]}$$

According to Equation 1, a sum k of the Euclidean distances between points m of left image data and points m' of right image data in a 3D format as shown in FIGS. 2(*a*) to 2(*d*) may be compared with a 3D determination threshold value. A determination may be made that the attribute of the content includes 2D image data or includes 3D image data based on the comparison result.

More specifically, if k is less than $\epsilon$ in blocks (herein pixels in the checker board format) of one frame, the video processor 114 may determine that the content includes 3D image. If k is equal to or greater than $\epsilon$ in the blocks (or pixels) of one frame, the video processor 114 may determine that the content includes 2D image data.

To increase accuracy of the attribute determination, two or more frames may be used, for example. More specifically, the video processor 114 may calculate k values, k1 and k2 of two frames and compare the sum of the k values with a value $\epsilon'$ to thereby determine the attribute of the content. The value $\epsilon'$ may be a 3D determination threshold defined for the example of using two or more frames.

Although two or more frames may be used, the k values of the frames may be calculated and compared with the value $\epsilon$ on a frame basis. Thus, the attribute of the respective frames may be determined and then the attribute of the content may be determined based on the attributes of all frames. A determination may be made that the content includes 3D image data only if all the attributes of the frames relate to 3D image.

Instead of determining the attribute of the content using all blocks or pixels of a frame in the above manner, a predetermined number of blocks or pixels in the frame may be used to determine the attribute of the content. If the content matches one of the 3D formats shown in FIGS. 2(*a*) to 2(*d*), the attribute of the content may be determined over all blocks or pixels of one or more frames and a determination may be made whether the attribute of the content is identical over the blocks or pixels. Therefore, accuracy of the attribute determination may be increased.

The video processor 114 may determine the attribute of the content over only one frame with respect to each of the 3D formats shown in FIGS. 2(*a*) to 2(*d*) and if the frame matches one of the 3D formats, determine the attribute of the content over one or more remaining frames with respect to the matched 3D format, thereby increasing accuracy of the attribute determination.

As described above, the video processor 114 may determine for every 3D format shown in FIGS. 2(*a*) to 2(*d*) by Equation 1 whether a received content matches the format in order to determine the attribute of the content. For example, the video processor 114 may determine the attribute of the content with respect to the Left/Right (L/R) format shown in FIG. 2(*a*). If the video processor 114 determines that the content does not match the L/R format, the video processor 114 may determine the attribute of the content with respect to the Top/Bottom (T/B) format shown in FIG. 2(*b*). If the video processor 114 determines that the content does not match the T/B format, the video processor 114 may determine the attribute of the content with respect to the checker board format shown in FIG. 2(*c*) and then the frame sequential format shown in FIG. 2(*d*) in a same manner.

If the content does not match any of the 3D formats shown in FIGS. 2(*a*) to 2(*d*), the video processor 114 may determine that the content includes 2D image data. On the other hand, if the content matches one of the 3D formats shown in FIGS. 2(*a*) to 2(*d*), the video processor 114 may determine that the content includes 3D image data. The video processor 114 may output the attribute determination result to the controller 115 so that the content may be appropriately processed.

As described above, the signal processing apparatus may find out the 2D attribute or the 3D attribute of a content in the received signal (i.e., whether the received signal is a 2D image or a 3D image) and appropriately process the signal based on its attribute. The appropriate processing means may notify the viewer that the image is a 3D image, if its attribute is a 3D image, thereby increasing contents accessibility and user convenience.

A description may now be provided of methods for indicating contents identified as 3D images from among received contents, distinguishable from 2D contents during providing OSD data to the viewer.

Example 1

Example 1 relates a method for indicating 3D contents (distinguishable from other contents) from among contents received through an external input device such as a USB device. For ease of description and example, a preview window of a movie view screen using a USB device may be described.

Figure 3:
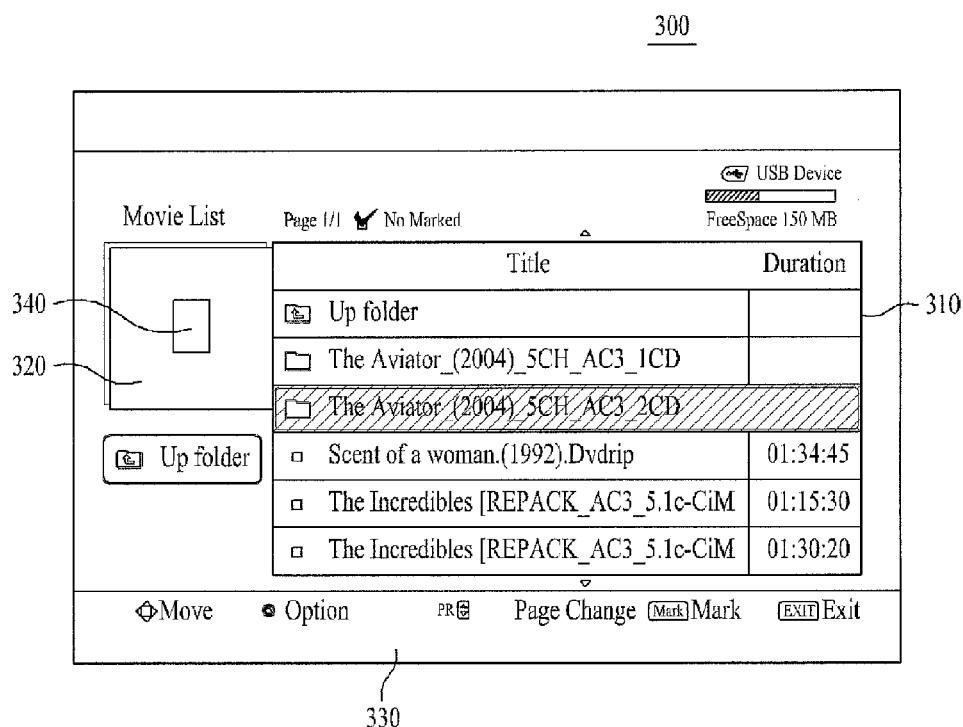
FIG. 3 illustrates an exemplary normal preview displayed in a user interface (UI) when a selected content includes a 2D content.

FIG. 3 illustrates an exemplary normal preview displayed in a UI when a selected content includes 2D content.

When a USB device is connected to the signal processing apparatus, a UI 300 configured as shown in FIG. 3 may be displayed on a screen.

FIG. 3 shows that the UI 300 includes a first item 310 with a list of contents (or programs), a second item 320 in which a preview image is displayed, and a third item 330 with other menus at a bottom of the UI 300.

The list of one of more contents stored in the USB device may be displayed in the form of folders in the first item 310.

A preview image of a content selected from the first item 310 may be displayed in the second item 320. In the example of FIG. 3, a 2D content may be selected from the first item 310 and thus a preview image of a 2D format may be displayed in the second item 320.

The third item 330 may be provided with menu buttons for executing associated functions such as Move, Option, Page Change, Mark, etc.

Figure 4:
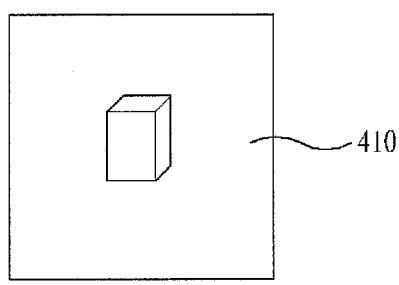
FIG. 4 illustrates a normal preview image of a 3D content in a 3D mode.

FIG. 4 illustrates a normal preview image of a 3D content in a 3D mode.

In FIG. 4, a normal preview image may be displayed in a 3D format in the second item shown in FIG. 3.

Figure 5:
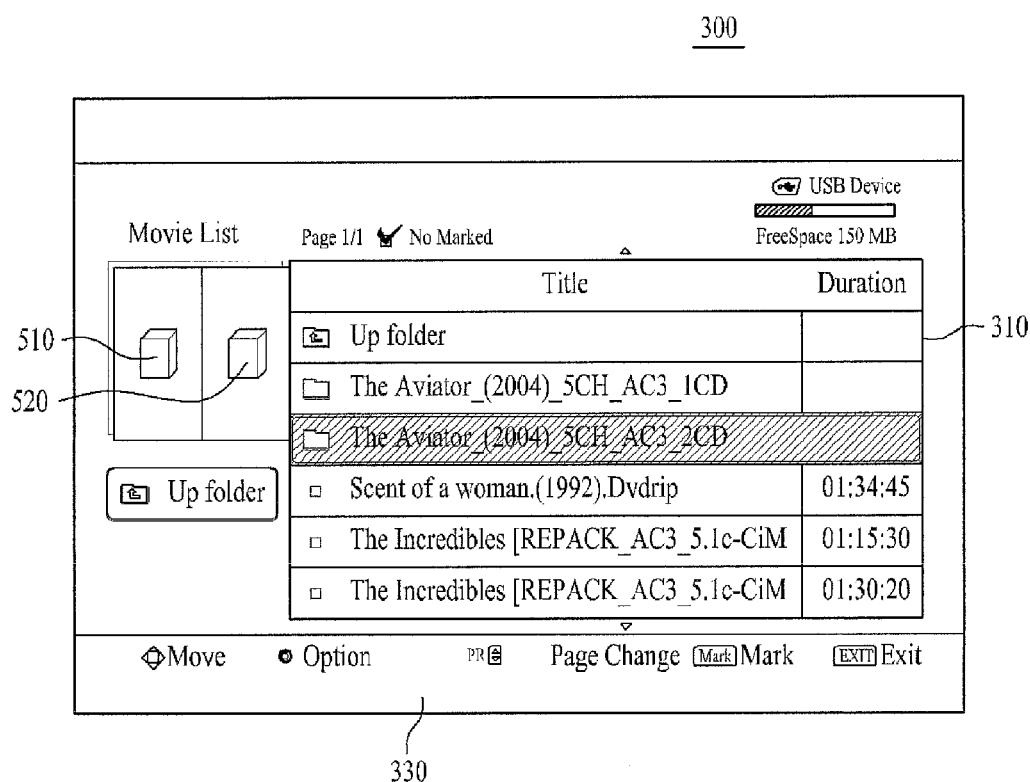
FIG. 5 illustrates an exemplary abnormal preview image of a 3D image.
Figure 6:
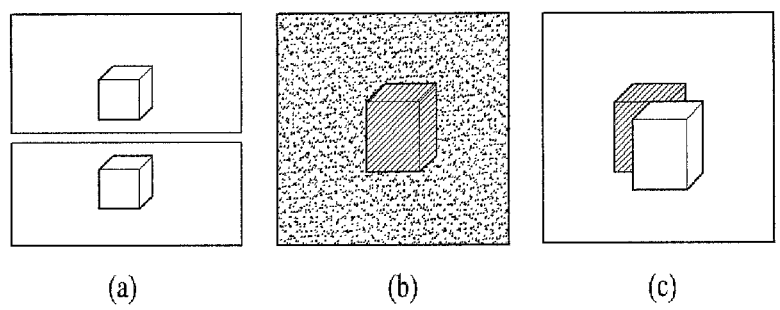
FIG. 6 illustrates other exemplary abnormal preview images of the 3D image in a preview window shown in FIG. 5.

FIG. 5 illustrates an exemplary abnormal preview image of a 3D image, and FIG. 6 illustrates other exemplary abnormal preview images of the 3D image in a preview window shown in FIG. 5.

As the UI shown in FIG. 5 is similar to the UI of FIG. 3 in configuration, only the difference between the UIs may be described herein.

Compared to the UI shown in FIG. 3, a preview image 510 and 520 may be displayed abnormally in a 3D format, unlike the preview image shown in FIG. 4.

Like the preview images shown in FIG. 5, abnormal preview images are shown in FIGS. 6(*a*), 6(*b*) and 6(*c*).

That is, FIGS. 5 and 6 commonly illustrate exemplary abnormal preview images in 3D formats. More specifically, the preview image is of the L/R format in FIG. 5, whereas the preview image is of the T/B format in FIG. 6(*a*), of the checker board format in FIG. 6(*b*), and of the frame sequential format in FIG. 6(*c*).

A reason for displaying the abnormal preview images as shown in FIGS. 5 and 6 may be that a viewer selects a 3D content during viewing in the 2D mode without a prior notice that the selected content is a 3D content and thus a preview of the selected content may be displayed in a 3D format despite the 2D-mode viewing. In case of the frame sequential format shown in FIG. 6(*c*), the image of the 3D content may flicker in the preview window, when it is viewed in the 2D mode.

Figure 7:
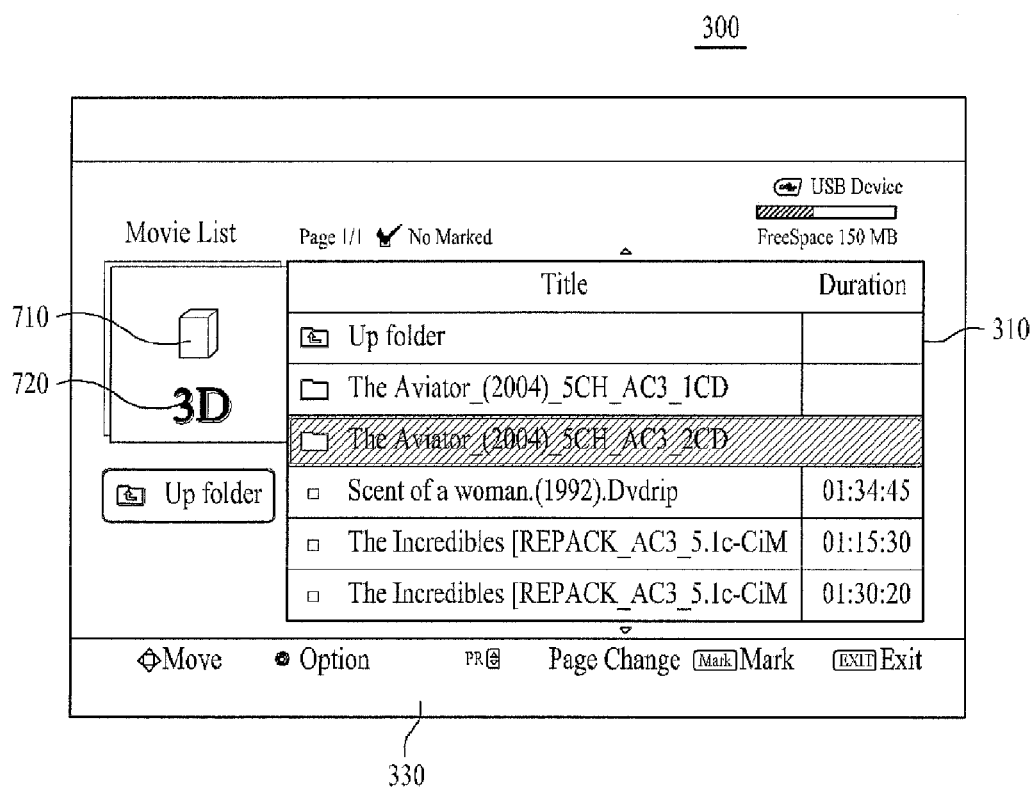
FIG. 7 illustrates a UI according to an example embodiment of the present invention.

FIG. 7 illustrates a UI according to an example embodiment of the present invention. Other embodiments and configurations are also within the scope of the present invention.

As discussed above, playing of a preview image of a 3D format as shown in FIGS. 5 and 6 may result in a blurry image, an overlapped image, and/or a flickering image. Therefore, the viewer may not enjoy the preview.

In this context, 3D content identification information may be displayed in the UI shown in FIG. 3 to distinguish 3D content from 2D content. For ease of description, a 3D indicator may be described as the 3D content identification information. The 3D content identification may be acquired from a received broadcast signal or an external input device.

As shown in FIG. 7, a 3D indicator 720 may be displayed under a preview image 710 to indicate 3D content. The preview image 710 may be displayed in a 2D format so that the viewer can view the preview image 710 although he is not in the 3D mode. Although not shown in FIG. 7, the 3D indicator may be displayed beside a title of the content in the first item 310 as well as under the preview image 710 or only in the title of the content. Since the 3D indicator 720 serves its purpose by fully indicating that a current content is a 3D content, the 3D indicator 720 does not need to be configured as a 3D image. That is, the 3D indicator may be configured as a 2D image or as a 3D image.

While the 3D indicator 720 is text in FIG. 7, the 3D indicator 720 may take the form of an icon. When a 3D content is selected, the 3D indicator may be output as a guide message "Wear glasses to view 3D images."

The following description may relate to UIs according to exemplary embodiments, with the appreciation that FIGS. 5 and 6 may be referred to for examples of abnormal displaying of 3D contents in the 2D mode.

Example 2

Example 2 relates to a UI configured during channel edition.

Figure 8:
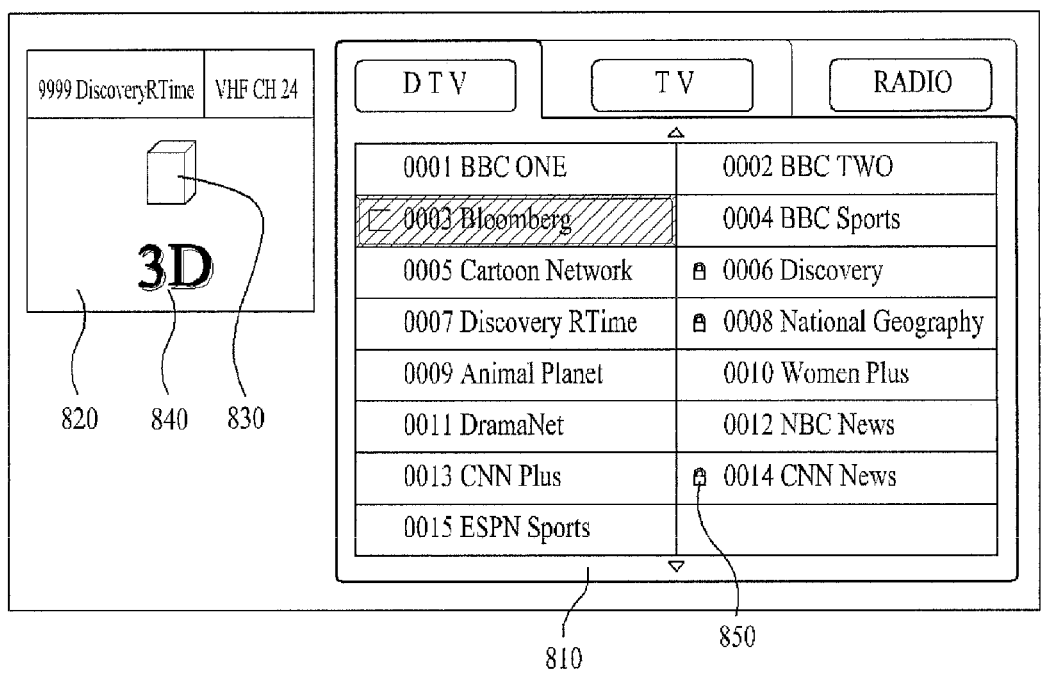
FIG. 8 illustrates a UI according to an example embodiment of the present invention.

FIG. 8 illustrates a UI according to an example embodiment of the present invention. Other embodiments and configurations are also within the scope of the present invention.

As shown in FIG. 8, a UI 800 may include a first item 810 with lists of available channels according to broadcasting types and a second item 820 for displaying a preview image 830 of a current content of a channel selected for channel edition from a channel list in the first item 810. In the first item 810, an indicator 850 may indicate that a channel is restricted or blocked due to a setting like a rating value displayed beside the name of the channel.

The preview image 830 of the current content of the channel selected from the first item 810 may be displayed and a 3D indicator 840 may be under the preview image 830, indicating that the current content is a 3D content, in the second item 820. As described above, the preview image 830 and the 3D indicator 840 may not be necessarily displayed as 3D images. The 3D indicator 840 may also be displayed beside the name of the channel in the first item 810.

The 3D indicator may be displayed only beside the name of each channel that provides 3D contents in a channel list, or beside the name of the 3D channel and over a preview image of the 3D channel. A sense of depth may be given to the names of 3D channels or the names of the 3D channels may be displayed in a different color from other channels to thereby perform a 3D indication function.

Example 3

Example 3 relates to a UI configured in a channel browser.

Figure 9:
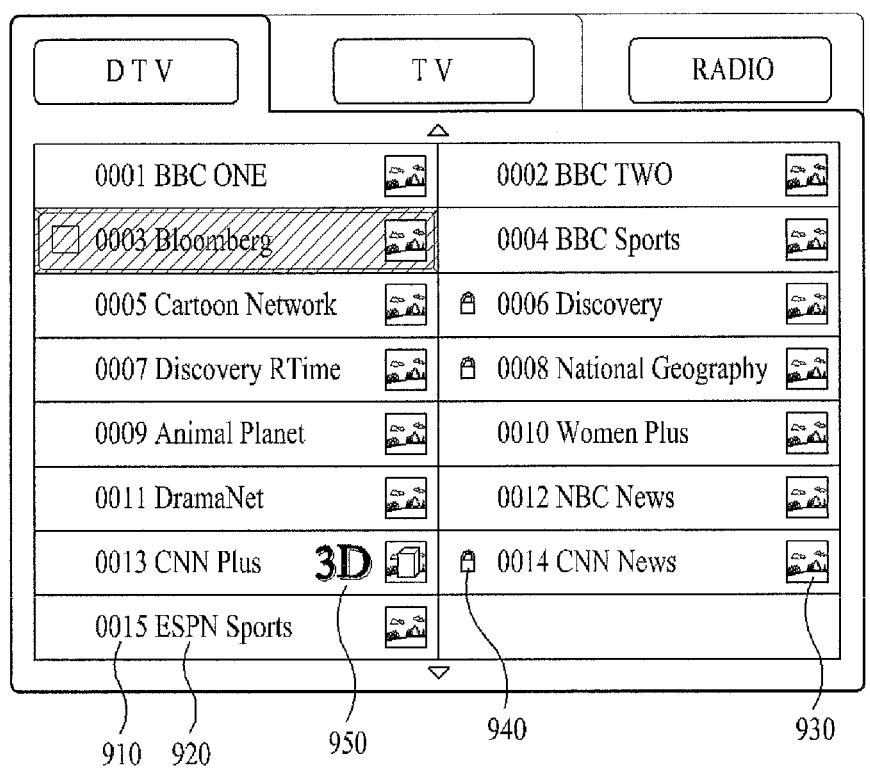
FIG. 9 illustrates a UI according to an example embodiment of the present invention.

FIG. 9 illustrates a UI according to an example embodiment of the present invention. Other embodiments and configurations are also within the scope of the present invention.

As sown in FIG. 9, a plurality of channels available according to broadcasting types may be displayed on a channel browser screen 900. Information about each channel may include a channel number 910, a channel name 920, a thumbnail image 930, and/or a blocking indicator 940 indicating whether a channel is blocked.

If a channel is a 3D channel or a content provided by the channel is a 3D content, a 3D indicator 950 may be further provided to indicate the 3D channel or the 3D content distinguishable from other channels (i.e., 2D channels). While the 3D indicator 950 may be displayed three-dimensionally in FIG. 9, the 3D representation of the 3D indicator 950 is not mandatory.

Figure 10:
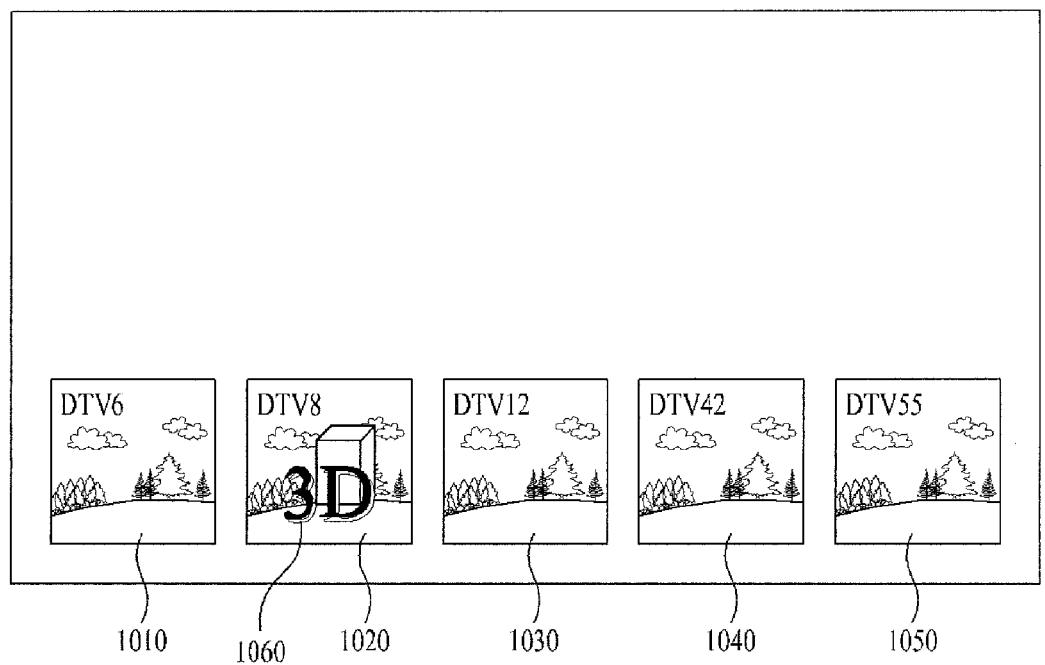
FIG. 10 illustrates a UI according to an example embodiment of the present invention.

FIG. 10 illustrates a UI according to an example embodiment of the present invention. Other embodiments and configurations are also within the scope of the present invention.

Referring to FIG. 10, the thumbnail images 930 shown in FIG. 9 may be displayed in a separate UI. Thumbnail images 1010 to 1050 may be shown for five channels.

If a specific channel, for example, DTV 8 may be a 3D channel or provide 3D content, a 3D indicator 1060 may be displayed over the thumbnail image 1020 to distinguish the channel from other channels.

While thumbnail images are configured in a separate UI in FIG. 10, when thumbnail images are included in a channel browser UI configured as shown in FIG. 9, a 3D indicator may be displayed over a thumbnail image for a 3D channel or a channel that provides 3D contents in the channel browser UI.

Example 4

Figure 11:
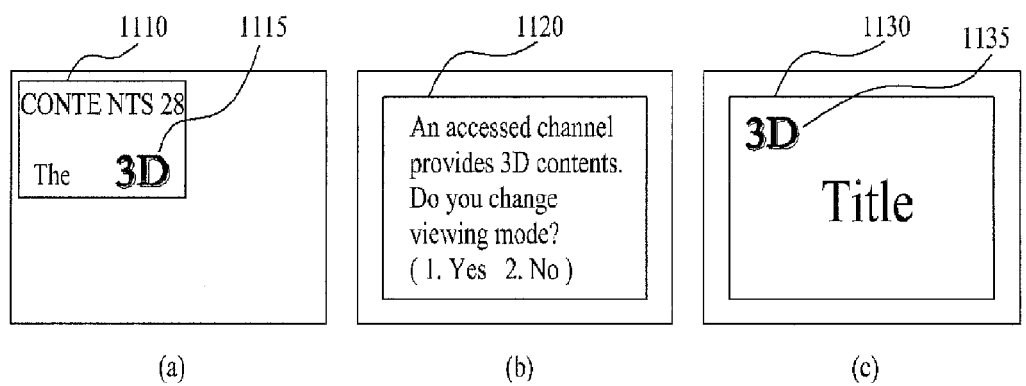
FIG. 11 illustrates a UI according to an example embodiment of the present invention.

FIG. 11 illustrates a UI according to an example embodiment of the present invention. Other embodiments and configurations are also within the scope of the present invention.

FIGS. 11(a), 11(b) and 11(c) show UIs or OSD screens configured to indicate that a channel searched during a channel search may provide 3D contents, distinguishable from a channel that provides 2D contents.

Since the viewer does not get knowledge of 3D channels during a channel search unlike the foregoing cases, the UIs or OSD screens may be configured as shown in FIGS. 11(a), 11(b) and 11(c) to indicate the 3D channels.

In FIG. 11(a), a 3D indicator 1115 may be displayed on a channel banner 1110 appearing during a channel search in the UI.

In FIG. 11(b), an OSD screen 1120 may indicate that an accessed channel provides 3D contents.

In FIG. 11(c), an OSD screen 1130 may display a 3D indicator 1135 over the title of a 3D content to indicate that an accessed channel provides the 3D content.

In the examples of FIGS. 11(b) and 11(c), when the viewer accesses a specific channel that provides 3D content during a channel search without prior channel information, the viewer may be notified of the 3D content by an OSD screen preliminarily during channel switching so that the viewer may view the channel in an appropriate mode. Accordingly, the viewer may skip the channel or view the 3D contents of the channel in a changed mode using the OSD screen.

Example 5

Example 5 relates to an Electronic Program Guide (EPG) screen.

Figure 12:
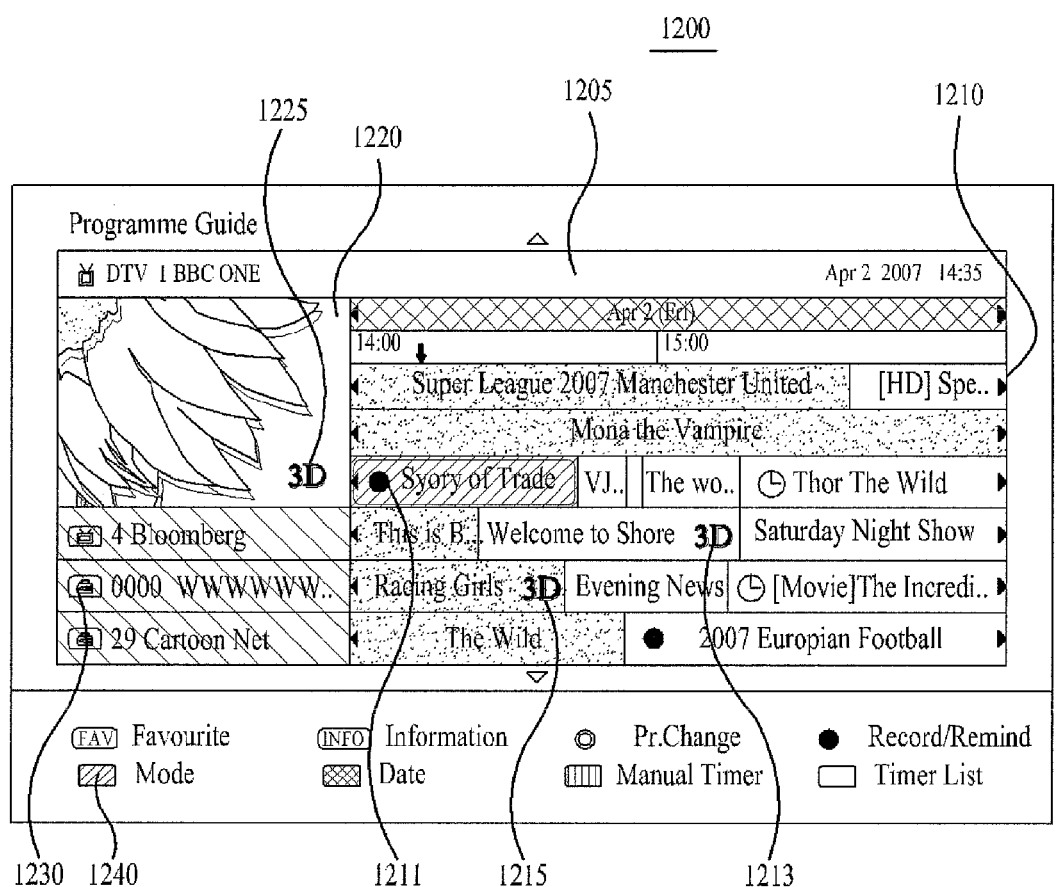
FIG. 12 illustrates an Electronic Program Guide (EPG) screen according to an example embodiment of the present invention.
Figure 13:
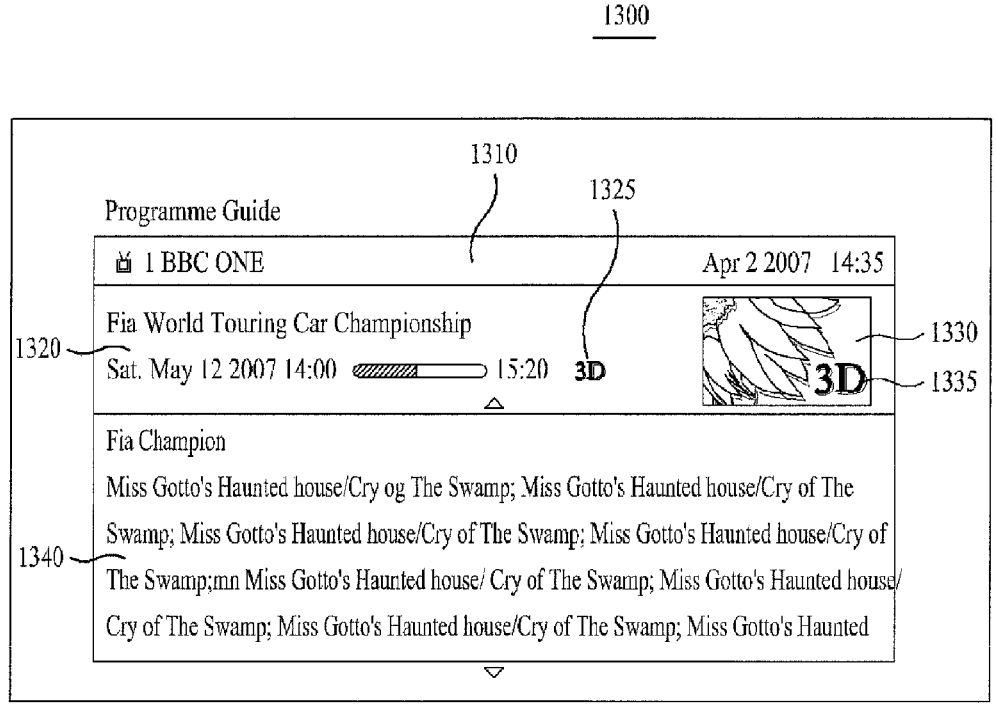
FIG. 13 illustrates an EPG screen according to an example embodiment of the present invention.
Figure 14:
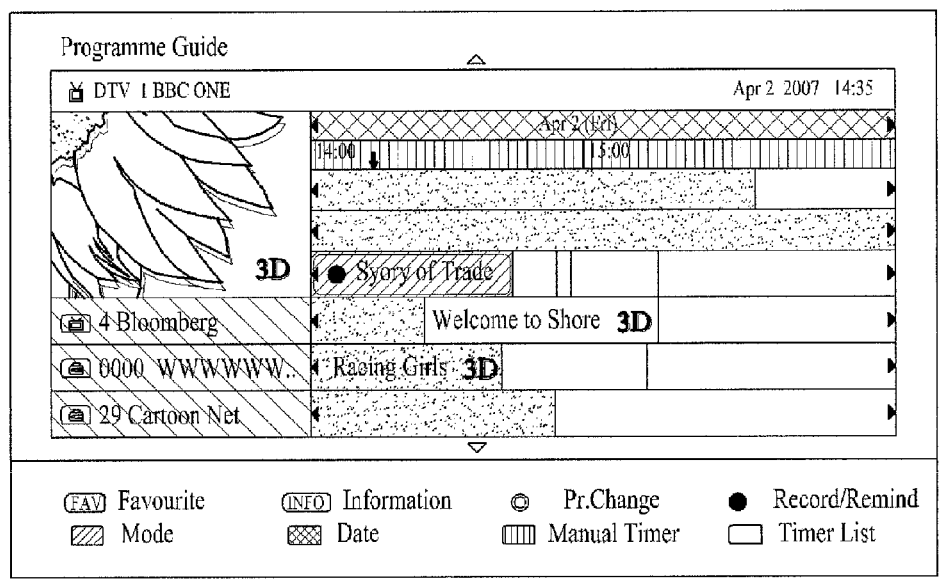
FIG. 14 illustrates an EPG screen according to an example embodiment of the present invention.

FIGS. 12, 13 and 14 illustrate EPG screens according to exemplary embodiments of the present invention. Other embodiments and configurations are also within the scope of the present invention.

As shown in FIG. 12, an EPG screen 1200 may include a first item 1205 indicating a current channel, a second item 1210 in which lists of contents for channels are displayed in a time order, a third item 1220 for displaying a preview image of a selected program 1211 from the second item 1210, a fourth item 1230 including additional information related to the preview image displayed in the third item 1220, and a fifth item 1240 for displaying other menus.

In FIG. 12, the EPG screen 1200 may include 3D indicators in various manners.

A 3D indicator may be displayed over the preview image in the third item 1220 while 3D indicators may not be displayed on the content lists in the second item 1210. Referring to FIG. 12, although a 3D indicator does not reside over a content 1211 selected from the content lists in the second item 1210, a 3D indicator 1225 may be positioned over the preview image in the third item 1220.

3D indicators may be displayed over the content lists in the second item 1210 while there is not a 3D indicator over the preview image in the third item 1220. Referring to FIG. 12, 3D indicators 1213 and 1215 may be displayed over two contents in the content lists of the second item 1210.

Additionally, the above two methods of displaying 3D indicators may be used in combination.

The 3D indicators may be configured as a 2D image or a 3D image. Along with or without the 3D indicators, 3D content may be indicated in a color or using depth information on the EPG screen 1200.

FIG. 13 illustrates a guide screen 1300 that displays details about a specific content selected from the EPG screen shown in FIG. 12.

As shown in FIG. 13, the guide screen 1300 may include a first item 1310 for indicating a current channel and a current time, a second item 1320 for indicating the title of a content and time information about the content, a third item 1330 for displaying a preview image, and a fourth item 1340 for displaying detail information about the content.

If the content includes 3D image data, the signal processing apparatus may display a 3D indicator 1325 or 1335 in at least one of the items 1310, 1320, 1330, 1340. The 3D indicator 1325 may be also configured in a 2D format or in a 3D format.

FIG. 14 illustrates an EPG screen 1400 that lists only 3D contents, as compared to the EPG screen 1200 shown in FIG. 12.

Referring to FIGS. 12 and 14, only the contents attached with the 3D indicators 1211, 1213 and 1215 in the EPG screen of FIG. 12 may be displayed in the EPG screen of FIG. 14, without the remaining 2D contents.

While the 3D contents are indicated in the EPG screen in FIG. 14, the 3D contents may be indicated in any manner other than the EPG screen.

Figure 15:
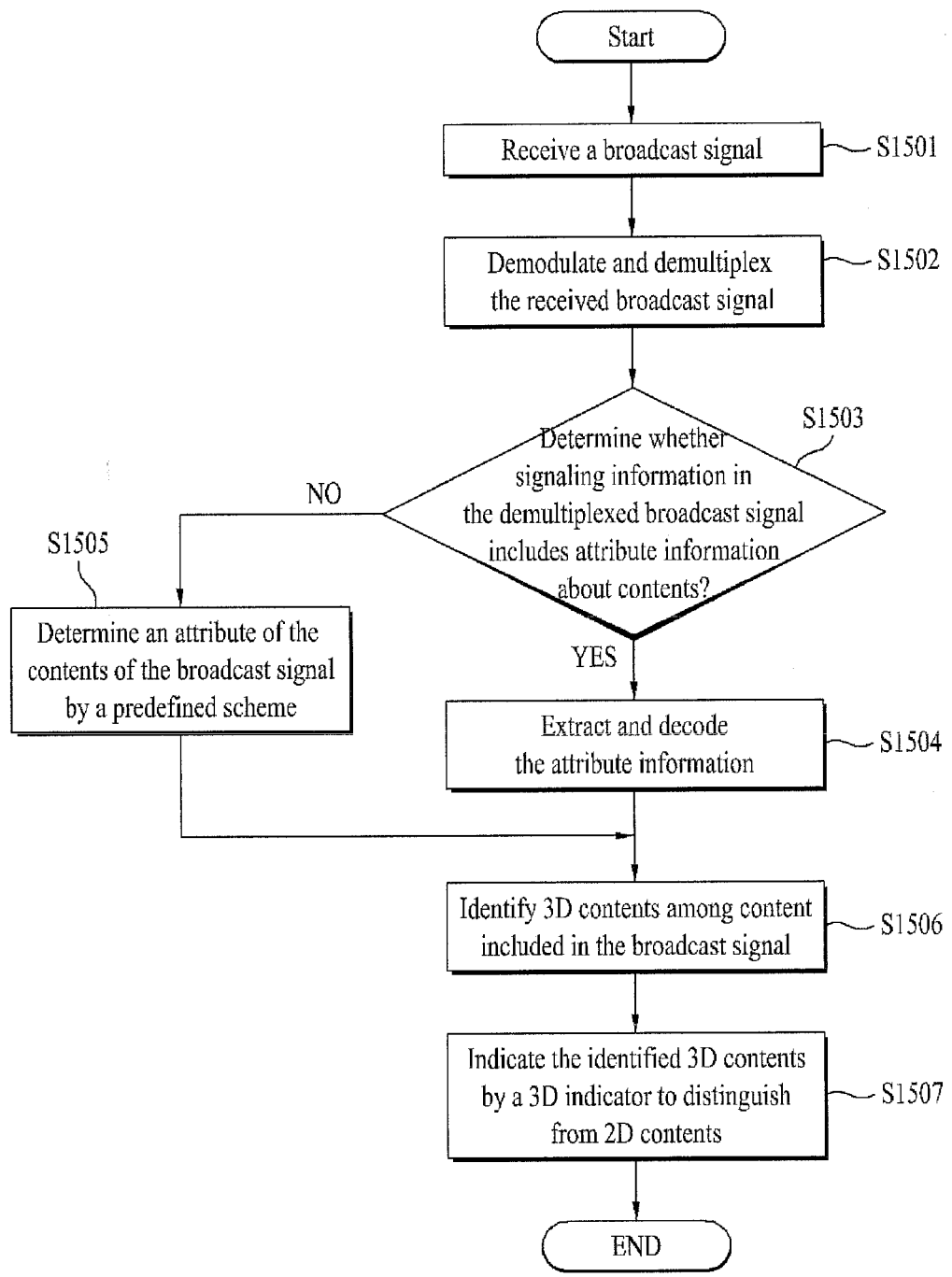
FIG. 15 is a flowchart illustrating a method for indicating 3D contents.

FIG. 15 is a flowchart illustrating a method for indicating 3D content. Other embodiments, operations and orders of operations are also within the scope of the present invention.

A signal may be received in operation S1501 and demodulated and demultiplexed in operation S1502.

A determination may be made in operation S1503 whether signaling information demultiplexed from the signal specifically includes attribute information about contents.

In the presence of attribute information within the received signal, the attribute information may be extracted from the signaling information and decoded in operation S1504. The extracted attribute information may identify a 3D image format or a 2D image format.

In operation S1506, 3D content may be identified from among contents included in the signal based on the decoded attribute information. The 3D content may be indicated in operation S1507 by 3D identification information such as a 3D indication (so as to distinguish from 2D content). The 3D identification information may be a 3D indicator or OSD data.

In the absence of the attribute information in operation S1503, attributes of the contents in the received signal may be determined in operation S1505 by a predefined scheme, such as by Equation 1 in the video processor.

The predefined scheme may identify a 3D image format or a 2D image format. In operation S1506, 3D content may be identified from among the contents included in the image signal based on the determined attributes. The 3D content may be indicated in operation S1507 by the 3D identification information such as a 3D indicator (so as to distinguish from 2D content). If 2D content is identified, then it may be displayed without proceeding through operations S1506 and S1507.

While the above procedure is for an example where a signal is received, an operation similar to operation S1503 through operation S1507 of FIG. 15 may be performed when contents are received through an external input device such as a USB device.

As described above, 3D content may be identified from received contents and may be distinguishable from 2D contents. Therefore, a viewer may be aware whether a content is a 2D image or is a 3D image, without confusion.

Embodiments of the present invention may be directed to a method and apparatus for determining a 3D content from among contents included in a received signal.

An embodiment of the present invention may provide a method and apparatus for indicating determined 3D contents distinguishable from other contents.

A method may be provided for indicating a three-dimensional (3D) content. The method may include (a) determining at a controller whether a received content includes 3D image data, (b) reading at a decoder 3D identification information for identifying a 3D image from the storage unit if the received content includes 3D image data, and (c) displaying at a display module the 3D identification information at a predetermined position of a screen.

A determination may be made whether attribute information about the received content is included in signaling information included in a signal carrying the content, and the attribute information may indicate whether the content includes two-dimensional (2D) image data or 3D image data.

A determination may be made whether attribute information about the received content is included in an info frame having additional information about the content, and the attribute information may include whether the content includes 2D image data or 3D image data.

The attribute information may be extracted and a determination may be made whether the received content includes 3D image data based on the attribute information.

If the attribute information is not included, a determination may be made whether the received content includes 3D image data by comparing a difference between blocks or pixels of image data forming the content with a 3D determination threshold value.

The 3D identification information may be an indicator or On Screen Display (OSD) data. The indicator may be a text image or an icon.

The 3D identification information may be configured as a 3D image.

The 3D identification information may be displayed over one of a preview image of the content or a thumbnail image of the content.

The 3D identification information may be displayed over information about the content displayed in the screen.

The 3D identification information may be displayed over one of information about the content displayed in an Electronic Program Guide (EPG) screen, a channel browser, information about the content in a contents list, or a banner indicating information about the content.

An apparatus may be provided for processing a signal. A receiving unit may receive a signal carrying a content, a storage unit may store three-dimensional (3D) identification information for identifying a 3D image, and a decoder may decode the received signal and read the 3D identification information from the storage unit. A controller may determine whether the received content includes 3D image data, control to read the stored 3D identification information if the received content includes 3D image data, and control the 3D identification information to be displayed at a predetermined position of information about the received content. A display module may display the information about the received content with the 3D identification information.

A signaling information processor may process signaling information included in the received signal.

The controller may control to extract attribute information about the received content from the processed signaling information, the attribute information indicating whether the content includes two-dimensional (2D) image data or 3D image data, and determine whether the received content includes 3D image data based on the attribute information.

A video processor may determine whether the received content includes 3D image data if the attribute information is not included.

The video processor may calculate a difference between blocks or pixels of image data forming the content, compare the difference with a 3D determination threshold value, and determine whether the received content includes a 3D image according to the comparison.

The controller may control the 3D identification information to be displayed over a preview image of the content or a thumbnail image of the content.

The controller may control the 3D identification information to be displayed over information about the content displayed in an Electronic Program Guide (EPG) screen, a channel browser, information about the content in a contents list, or a banner indicating information about the content.

The controller may control the 3D identification information to be configured as a 3D image.

The controller may use one of an indicator or On Screen Display (OSD) data as the 3D identification information, the indicator being a text image or an icon.

The controller may control to extract attribute information from an info frame including additional information about the received content, the attribute information indicating whether the received content includes 2D image data or 3D image data, and determine an attribute of the received content based on the extracted attribute information.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method comprising:
    receiving a signal that includes content and signaling information configuring a program guide for the content at a receiving unit;
    decoding the signaling information from the signal;
    displaying the program guide with a perceived three-dimensional (3D) indicator on a screen of a display unit, wherein the perceived 3D indicator is displayed, by an on screen display (OSD) generator, on both a preview window and an item in the displayed program guide simultaneously, and the perceived 3D indicator identifies that the item corresponds to a perceived 3D content;
    decoding, at a decoder, content selected from the displayed program guide;
    displaying, on the display unit, the decoded content with a channel browser having the perceived 3D indicator on the screen, wherein the 3D indicator is a perceived 3D image; and
    when attribute information indicating whether the content includes 3D image data or not is not included in the signaling information, determining whether or not the content includes 3D image data by comparing a difference between blocks or pixels included in a single frame of image data forming the content with a determination threshold value, and
    wherein the comparing is referenced by an equation $\int \Sigma (m-m') = k < \epsilon$ ($\epsilon$ is a 3D determination threshold value), where the k is a sum of Euclidean distances between points m of left image data and points m' of right image data.

2. The method of claim 1, wherein displaying the decoded content with the channel browser having the perceived 3D indicator includes at least one of:
    outputting a user interface (UI) for selecting a viewing mode to change into a 3D viewing mode in response to a user's action; and
    outputting the perceived 3D indicator on the output content for a predefined period after outputting the UI.

3. The method of claim 1, further comprising determining whether the attribute information is included in the signaling information.

4. The method of claim 3, further comprises:
    extracting the attribute information from the signaling information; and
    determining whether the content includes 3D image data based on the extracted attribute information.

5. The method of claim 3, further comprising when the attribute information is not included in the signaling information, determining whether or not the attribute information about the content is included in an information frame having additional information about the content, the attribute information within the info frame indicating whether the content includes 3D image data.

6. The method of claim 1, wherein the 3D indicator is one of a text image or an icon displayed three-dimensionally.

7. An image display apparatus for processing three-dimensional (3D) content, comprising:
    a receiver for receiving a signal that includes content and signaling information configuring a program guide for the content;
    a storage for storing content, signaling information and a perceived indicator;
    an on screen display (OSD) generator for generating the perceived 3D indicator to display on both a preview window and an item in a program guide to be displayed simultaneously, and the perceived 3D indicator to identify that the item corresponds to a 3D content;
    a display for displaying, on a screen, the program guide with the generated perceived 3D indicator;
    a video processor for determining whether or not the content includes 3D image data by comparing a difference between blocks or pixels included in a single frame of image data forming the content with a determination threshold value when attribute information indicating whether the content includes 3D image data or not is not included in the signaling information;
    decoder for decoding the content selected from the displayed program guide; and
    a controller for controlling the display to display the program guide with a channel browser having the perceived 3D indicator on the screen and the decoded content,
    wherein the 3D indicator is a perceived 3D image, and
    wherein the video processor is referenced for comparing by an equation $\int \Sigma (m-m') = k < \epsilon$ ($\epsilon$ is a 3D determination threshold value), where the k is a sum of Euclidean distances between points m of left image data and points m' of right image data.

8. The apparatus of claim 7, wherein the controller further controls the display to output at least one of a user interface (UI) for selecting a viewing mode to change into a 3D viewing mode in response to a user's action, and the perceived 3D indicator on the output content for a predefined period after output of the UI.

9. The apparatus of claim 7, wherein the controller is configured to control to extract the attribute information about the content from the signaling information, the attribute information indicating whether the content includes 3D image data, and determines whether the content includes 3D image data based on the extracted attribute information.

10. The apparatus of claim 7, wherein the video processor calculates a difference between blocks or pixels of image data forming the content, compares the difference with a threshold value, and determines whether the content includes 3D image data based on the comparison.

11. The apparatus of claim 7, wherein the 3D indicator is one of a text image or an icon displayed three-dimensionally.

12. The apparatus of claim 7, wherein the controller controls to extract attribute information from an information frame that includes additional information about the content, the attribute information indicating whether the content includes 3D image data, and determines an attribute of the content based on the extracted attribute information within the information frame.

* * * * *